C. Biehl,
Garden Tile.

No. 113,007. Patented Mar. 28, 1871.

Attest
V. Colvin
N. Lodge

Inventor
Charles Biehl

United States Patent Office.

CHARLES BIEHL, OF ALBANY, NEW YORK.

Letters Patent No. 113,007, dated March 28, 1871.

IMPROVEMENT IN COMBINED BORDERING AND DRAIN-TILES.

The Schedule referred to in these Letters Patent and making part of the same.

I, CHARLES BIEHL, of Albany, in the county of Albany and State of New York, have invented certain Improvements in Combined Bordering and Drain-Tile, or tile for forming the borders of flower-beds, along walks, &c., of which the following is a specification.

Nature and Objects of the Invention.

The first part of my invention relates to an improvement in the form of the tile, which gives great stability, and which is besides neat and ornamental.

The second part of my invention relates to a tubular opening in the tile, which makes it also a drain-tile, and carries off the surface-water from the walks after a rain-storm, &c.

My invention, therefore, consists of a combination of the "bordering-tile" with the "drain-tile," of the peculiar shape or design shown in the drawing.

Description of the Accompanying Drawing.

Figure 1:
Figure 1 is a representation in perspective of a tile embodying my invention.
Figure 2:
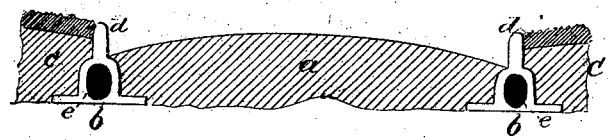
Figure 2 is a vertical transverse section of a garden walk, $a$, with flower-beds on either side, $c\ c$, which are bordered and supported by the tile hereinafter described.

General Description.

The tiles are constructed of the material and in the manner which is usual. They are laid along the border of flower-beds, walks, roads, or where needed, with the broad flat base downward, as represented at $b$ and $b$.

When the walk is made the convexity forming the outside of the drain-tube of the tile is covered by the dirt or gravel, &c., of the walk; but the comb or ridge of the tile remains exposed and above ground, except where, on its inner side, the flower-bed or its equivalent $c\ c$ is upheld and supported by it.

By means of this combined bordering and drain-tile the walks are kept clear of grass, the water is rapidly drained off the walks, and the roots, &c., prevented from growing out into the walks.

Claim.

I claim as my invention—

The combined bordering and drain-tile herein shown, consisting of the tube $e$, base-plate $b$, and comb $d$, constructed and arranged substantially as set forth.

CHARLES BIEHL.

Witnesses:
V. COLVIN,
GEO. D. HILL.